(12) United States Patent
Buytaert et al.

(10) Patent No.: US 6,249,596 B1
(45) Date of Patent: Jun. 19, 2001

(54) METHOD OF LOCATING SATURATED PIXELS IN THE DISPLAY OF A RADIOGRAPHIC IMAGE

(75) Inventors: Tom Buytaert, Kontich; Stefan Van de Velde, Zaventem, both of (BE)

(73) Assignee: AGFA-Gevaert, Mortsel (BE)

( * ) Notice: Subject to any disclaimer, the term of this patent is extended or adjusted under 35 U.S.C. 154(b) by 0 days.

(21) Appl. No.: 08/335,915

(22) Filed: Nov. 8, 1994

(30) Foreign Application Priority Data

Nov. 23, 1993 (EP) ................................................ 93203277

(51) Int. Cl.[7] ....................................................... G06K 9/00
(52) U.S. Cl. .............................................. 382/132; 382/374
(58) Field of Search .................................... 382/132, 299, 382/128, 274; 378/98.7

(56) References Cited

U.S. PATENT DOCUMENTS

| | | | |
|---|---|---|---|
| 4,387,428 | * | 6/1983 | Ishida et al. .......................... 364/414 |
| 5,447,153 | * | 9/1995 | Weil et al. ............................. 128/630 |
| 5,453,766 | * | 9/1995 | Feytens et al. ....................... 347/227 |
| 5,461,655 | * | 10/1995 | Vuylsteke et al. ...................... 378/62 |
| 5,467,404 | * | 11/1995 | Vuylsteke et al. .................... 382/299 |
| 5,471,987 | * | 12/1995 | Nakazawa et al. ................... 128/659 |
| 5,536,946 | * | 7/1996 | Vuylsteke ............................. 250/586 |
| 5,546,473 | * | 8/1996 | Buytaert et al. ...................... 382/299 |

\* cited by examiner

Primary Examiner—Andrew W. Johns
(74) Attorney, Agent, or Firm—Schmeiser, Olsen & Watts

(57) ABSTRACT

Method of locating saturated pixels in the display of a radiographic image.

In order to locate saturated pixel values in the display of a digital image representation that was subjected to a signal-to-density transformation, the pixel values of the digital image representation are subjected to a second signal-to-density transformation that is substantially equal to the first transformation with the exception of at least one discontinuity situated in (a) saturated pixel value(s).

13 Claims, 3 Drawing Sheets

METHOD OF LOCATING SATURATED PIXELS IN THE DISPLAY OF A RADIOGRAPHIC IMAGE

DESCRIPTION

1. Field of the Invention

The present invention is in the field of digital radiography. The invention more specifically relates to a method and an apparatus for displaying a radiographic image and for locating saturated pixels in the displayed image.

2. Background of the Invention

In the field of digital radiography, a wide variety of image acquisition techniques have been developed such as computerized tomography, nuclear magnetic resonance, ultrasound, detection of a radiation image by means of a CCD sensor or a video camera, radiographic film scanning, etc. By means of these techniques a digital representation of a radiographic image is obtained.

In still another technique, a radiation image, for example an image of x-rays transmitted by an object, is stored in a screen comprising a photostimulable phosphor such as one of the phosphors described in European patent publication 503 702 published on 16.09.92 and U.S. Ser. 07/842,603. The technique for reading out the stored radiation image consists of scanning the screen with stimulating radiation, such as laser light of the appropriate wavelength, detecting the light emitted upon stimulation and converting the emitted light into an electric representation for example by means of a photomultiplier and finally digitizing the signal.

The digital images obtained by one of the acquisition techniques described hereinbefore can be subjected to a wide variety of image processing techniques.

If the unprocessed original image representation is stored, it can be subjected off-line to different types of image processing techniques as well as to processing using different values of the processing parameters as frequently as required.

The processed or unprocessed images can further be applied to a display device and/or can be reproduced by means of an image recorder such as a laser recorder or the like.

For the purpose of display and/or hard copy recording signal values are converted into density values envisioned in the display or hard copy according to a signal-to-density mapping curve that has a predetermined shape in between a minimum and a maximum displayable or reproducible density value.

Prior to display or hard copy recording the image is commonly subjected to a window/levelling operation. A subrange within the entire range of acquired signal values is defined. Within this range signal values are mapped to density values between said minimum and maximum density values and outside this range signal values are mapped onto the minimum density value if they are smaller than the minimum value of said subrange and onto the maximum density value if they are larger than the maximum value in said subrange.

The determination of this subrange, i.e. its position and its width relative to the entire range of acquired signal values, can be predefined for example as a specific characteristic of a particular examination type. Alternatively the width and position of the range, also called the window and the level, can be determined under visual control by applying the acquired image signal to a monitor for example part of a workstation, and by changing brightness and contrast of said monitor until the display provides an image that satisfies the operator.

Contrast and brightness controls provide a shift of the signal-to-density conversion curve relative to the acquired signal range. Contrast and brightness will be adjusted so that the display provides a visual image on which image detail in the diagnostically relevant area is discernable.

It is advantageous that the shape of the signal-to-density mapping curve in between the minimum and maximum density values referred to hereinbefore is similar to the shape of the sensitometric curve of a radiographic film because the radiologist is acquainted with the characteristics, more specifically with the sensitometry of the conventional radiographic film.

For display purposes, it is furthermore advantageous to incorporate into the signal-to-density transformation a compensation for non-linear behavior of the display device.

Because of the digitization process at the input of a display device commonly having a dynamic range that is smaller than the range of acquired pixel values, more than one original pixel value is mapped onto a single input value for the display device. This input value of the display device is then later converted into a single density value so that different original pixel values are finally mapped into a single density value.

Such pixels originating from different original pixel values and being mapped onto a single density value in the display are referred to as "saturated pixels".

In a saturated pixel area no differences between density values originating from pixels with different pixel values can be discerned with the result that valuable information might get lost.

In addition, the saturated pixels may not be recognized as being "saturated" given the limited dynamic range of the state of the art display devices. Under these circumstances discrimination on the screen of a saturated image area relative to non-saturated image area or pixels is difficult.

When evaluating a radiographic image on a display, the radiologist may not be aware of the fact that relevant pixels have become saturated and that in fact the effective density in these pixels is different from the density seen on the displayed image.

Moreover, when making a hard copy of an image (using the above mapping curve) wherein saturated areas are present on a hard-copy reproduction medium such as a photographic film, the saturated areas become visible due to the larger dynamic range of the hard copy material relative to that of the display device. Saturated areas are rather disturbing during image interpretation.

Objects of the Present Invention

It is an object of the present invention to provide a method of determining the location of pixels that are saturated in a system wherein a radiographic image is acquired in the form of a digital signal representation and wherein the radiographic image is visualized on a display device.

It is a further object to display an image in such a way that pixels which are important for the diagnostical evaluation process of a radiographic image are not saturated.

It is a further object to provide such a method for application on a display monitor of a workstation.

It is still a further object to provide such a method for application in a system wherein a radiographic image is stored in a photostimulable phosphor screen and wherein said screen is scanned with stimulating irradiation, the light emitted upon irradiation is detected and converted into a digital signal representation.

Further objects will become apparent from the description hereinafter.

Statement of the Invention

The objects of the present invention are achieved by a method of determining the location of pixels in a radiographic image that are saturated when digital pixel values of said image are transformed into density values in accordance with a first signal-to-density transformation comprising the steps of -converting the digital pixel values of said radiographic image into density values in accordance with a second signal-to-density transformation that is substantially identical to said first transformation except that it comprises at least one discontinuity in a pixel value corresponding with a pixel of said image that would be saturated when being converted in accordance with said first transformation, and -applying pixel values converted according to said second transformation to a display device.

In this context by the term "saturated pixels" is meant pixels originating from different pixel values that are converted onto a single input value for the display device. These different pixel values are then further converted into a single density value.

By evaluation of the signal-to-density mapping transformation the pixel values can be found that would result in saturated pixels when being converted in accordance with that transformation. However, the location of the saturated pixels in the image cannot be found by simple evaluation of the transformation. Display of the image following the method steps of the present invention provides visualization of the location of saturated pixels.

In the context of this invention, the signal-to-density transformation generally consists of the combination of a transformation mapping of signal values into discrete input values for the display device and a transformation which converts input values of the display device into density values, the latter transformation often being a nonlinear transformation that can additionally be compensated.

By transforming the original digital image representation in accordance with said second transformation having a discontinuity(ies) in (an) abscissa value(s) that would be transformed by the first transformation into an ordinate value into which more than one different abscissa value would be transformed, (the corresponding pixels in the display being saturated pixels) and by displaying the pixels that are transformed according to said second transformation, the location of the saturated pixels becomes discernable in the display.

The discontinuity may be present in a single pixel value. Alternatively more than one discontinuity can be present in isolated pixels and still alternatively the transformation may be discontinuous over a range of pixel values.

The ordinate value of the second transformation in (a) discontinuity(ies) can be set as follows: within a continuously evolving transformation a, discontinuity can be present wherein an abscissa value is mapped onto the maximum displayable density value (or intensity value) so that saturated pixels will show as black pixels on the display device. Alternatively or additionally in the discontinuity of the conversion function, an abscissa value can be transformed into an ordinate value that is equal to the minimum displayable value so that saturated pixels will be shown as white pixels in the display.

Further alternatives can be envisioned but it is in any way most convenient that an ordinate value in a discontinuity differs largely from the ordinate value in pixels neighboring this discontinuity so that when converting an image in accordance with the second conversion transformation, saturated pixels become very well visible by the large difference that exists between their proper density and the density of the surrounding area.

In a specific embodiment of the present invention, the digital representation of the radiographic image is obtained by scanning a photostimulable phosphor screen wherein an image has been stored with stimulating irradiation, detecting the light emitted upon stimulation and converting the detected light into a digital signal representation.

In a particular embodiment of this invention, the first signal-to-density transformation has a shape obtained as a combination of a transformation curve approximating the sensitometric curve of a photographic film the radiologist is acquainted with, the non-linear output characteristic of a display device and a curve which provides a compensation of this non-linear characteristic.

Said first transformation can then be represented by a monotonically increasing function having an S-shape whereby signal values smaller than a predetermined minimum value are transformed into a value equal to the minimal displayable density value and signal values above a predetermined maximum value are transformed into a value equal to the maximum displayable density value.

A way of composing the component which is a simulation of the sensitometric curve of a radiographic film is described in European application 549 009.

The predetermined values being the extremities of the range wherein the transformation has an S-shape are the extremities of the signal range relevant for display and further for diagnosis.

The second transformation then preferably has substantially the same shape as the first transformation with the exception of a first discontinuity situated at said minimum value and a second discontinuity situated at said maximum value.

The ordinate value of pixel values smaller than the pixel values wherein said first discontinuity is situated is then preferably equal to the maximum of displayable density values and the ordinate value of pixel values larger than said second discontinuity is preferably equal to the minimum of displayable density values so that the ordinate values differ largely from the surrounding ordinate values resulting in optimal visibility of the locations of pixels that are saturated when the first transformation is applied.

When the locations) of so-called saturated pixel value(s) is detected on the displayed image, the radiologist or the operator can evaluate whether the fact that the located pixels are saturated is disturbing for the diagnostical evaluation process.

In other words, one will be able to decide whether or not any diagnostically relevant information might be lost.

This evaluation depends on the type of examination that is performed and on the expected diagnosis.

In the event that the exact pixel values in a saturated area would be relevant for the purpose of diagnosis, the operator or radiologist may decide that the first transformation which is the cause of the saturation appearing in the display is unsatisfactory and might decide to change that first transformation curve so as to avoid saturation in diagnostically relevant locations.

In a practical embodiment this amendment is implemented by changing the values in the look up table representing this transformation.

A suitable amendment can for example be obtained by increasing the slope of said first conversion transformation so that locally less pixel values are mapped onto a single ordinate value and so that variations between individual pixel values will be detectable.

In practice, the procedure will often be an iterative one in which an image obtained by conversion of pixel values according to a first transformation is displayed.

The pixel values are then subjected to a second transformation having at least one discontinuity located at the abscissa values of saturated pixels.

The image resulting from display of the transformed pixel values according to the second transformation and especially the location of saturated pixels is evaluated. If necessary the first conversion curve is amended so as to get pixels in diagnostically relevant areas out of saturation. Next an amended 'second conversion curve' is defined and the process can be restarted.

This sequence is repeated until a satisfactory image is obtained on a display. Finally the displayed image can be applied to a hard copy recorder for obtaining a hard copy image, for example on film.

It will be clear to the man skilled in the art that the amendments of the signal-to-density transformation could also be performed on the second transformation and that then this second transformation is used for transforming the pixel values of the radiographic image into displayable density values.

The present invention is performed on a workstation comprising
  -means for storing a first signal-to-density transformation,
  -means for storing a second signal-to-density transformation that is substantially identical to said first transformation with the exception of at least one discontinuity located in (a) pixel value(s) that was saturated when being converted in accordance with said first transformation,
  -means for transforming a digital image representation in accordance with one of these transformations, and
  -means for displaying the transformed images.

The workstation may additionally comprise a user interface adapted for changing the position of said discontinuity (ies) within the range of signal values of said digital representation and for changing the width of the range wherein said second transformation is discontinuous.

BRIEF DESCRIPTION OF THE DRAWINGS

Further details concerning the method and apparatus according to the present invention are described hereinbelow with reference to the drawings.

DETAILED DESCRIPTION OF THE DRAWINGS

Figure 1:
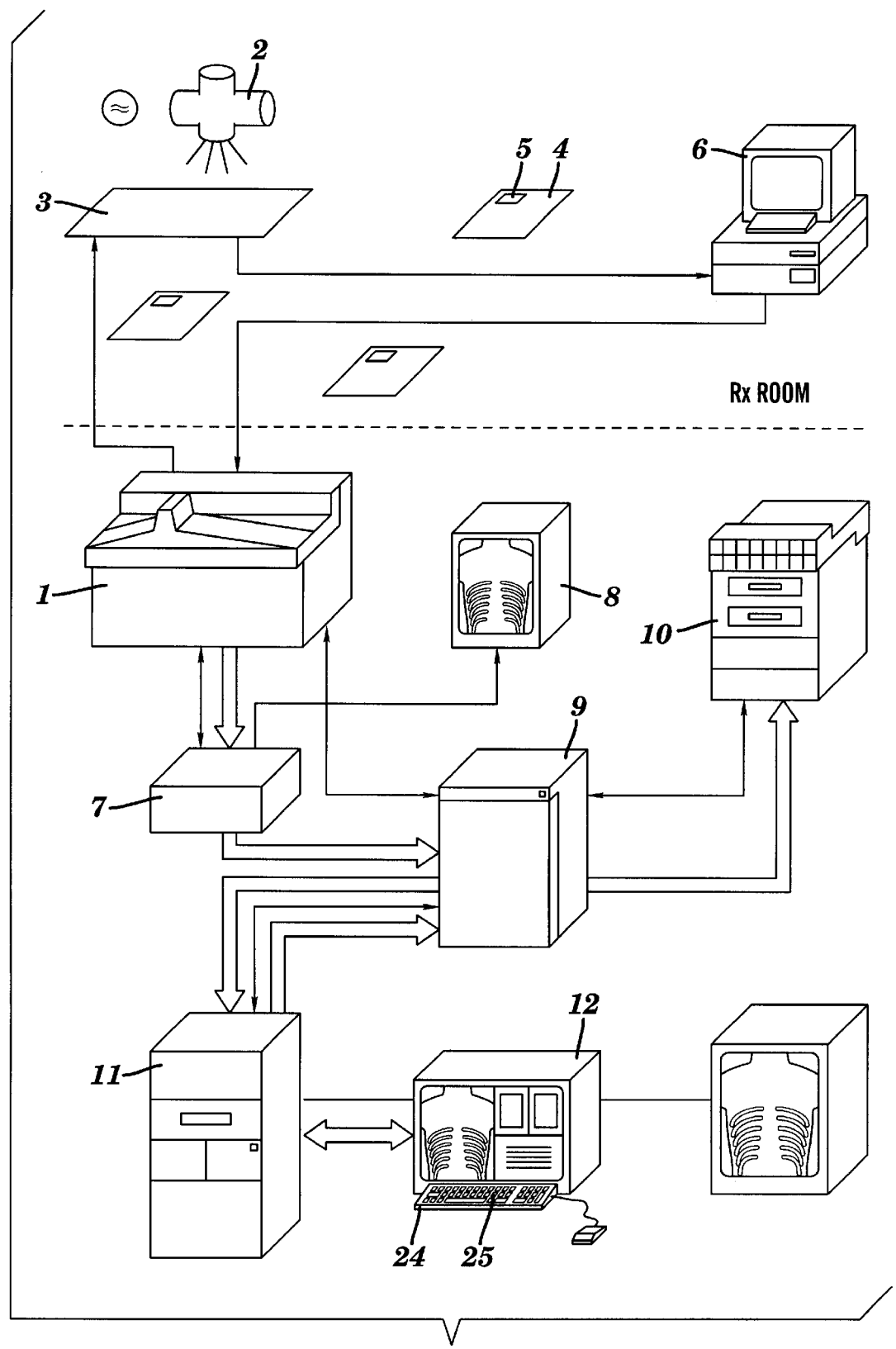
FIG. 1 generally shows a system in which the method of the invention can be applied.

FIG. 1 generally shows apparatus in which the method of the invention can be applied.

A radiation image of an object was recorded on a photostimulable phosphor screen (3) by exposing (2) said screen to x-rays transmitted through the object (not shown). The stimulable phosphor screen was conveyed in a cassette (4) provided with an electrically erasable programmable read only memory (EEPROM) (5). In an identification station (6) various kinds of data, for example patient identification data (name, date of birth) and data relating to the exposure and/or to the signal processing such as processing parameters were written into the EEPROM (5).

Figure 2:
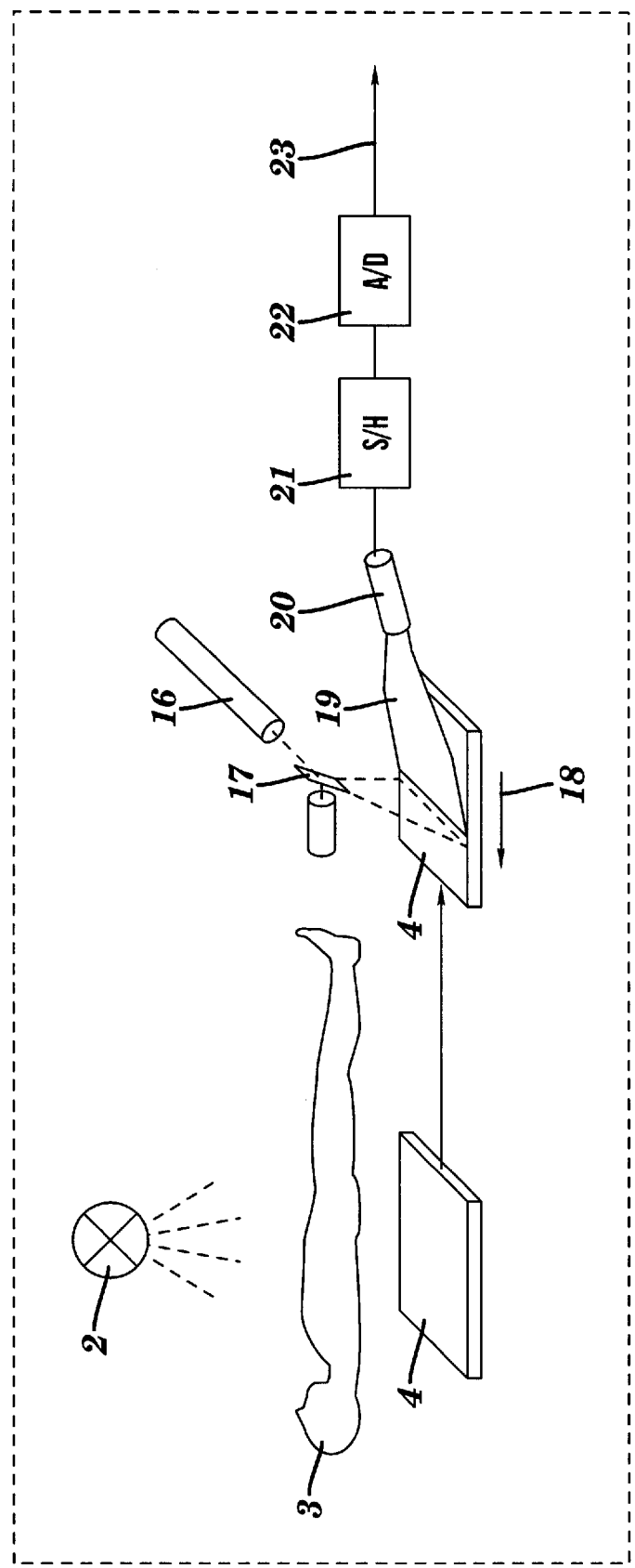
FIG. 2 is a specific embodiment of an apparatus for reading out an image stored in a photostimulable phosphor screen.

In a radiation image read-out apparatus (1) the information stored in the EEPROM and the image stored in the photostimulable phosphor screen were read-out. The read-out method is illustrated in FIG. 2. The stored image was read-out by scanning the phosphor screen with stimulating rays emitted by a laser 16. The stimulating rays were deflected into the main scanning direction by means of galvanometric deflection 17. The subscanning was performed by transporting the phosphor screen in the subscanning direction 18. The stimulated emission was directed by means of a light collector 19 onto a photomultiplier 20 for conversion into an electrical image representation. Next, the signal was sampled by a sample and hold circuit 21, converted into a logarithmic quantity log E (E representing the exposure value) and quantized by means of an analog to digital convertor 22. The digital image signal 23 was sent to the image processing module of the read-out apparatus (FIG. 1, numeral 7) where it was stored in an internal buffer.

The read-out signal was also applied to a preview monitor 8 for display immediately after read-out providing an operator with an early feed back on the performed exposure.

The read-out apparatus 1 and processing module 7 was further connected to a workstation 11 and associated review console 12 where off-line processing was performed.

The read-out apparatus and associated processor as well as the workstation and associated review console were connected via a buffer 9 to an output recorder 10.

Image processing performed on the digital representation of the radiographic image either on-line in the processing unit of the read-out apparatus or off-line in the workstation was in this particular embodiment performed on a multiresolution representation, more specifically a pyramidal multiresolution representation of the image.

This multiresolution representation was obtained by decomposing the original image into a sequence of detail images at multiple resolution levels and a residual image at a resolution level lower than the minimum of said multiple resolution levels. The number of pixels in each detail image decreases at each coarser resolution level.

The detail images at successively coarser resolution levels were obtained as the result of each of K iterations of the following steps:

a) computing an approximation image at a next coarser level by applying a low pass filter to the approximation image corresponding to the current iteration, and subsampling the result in proportion to the reduction in spatial frequency bandwidth, using however the original image as input to said low pass filter in the course of the first iteration; and b) computing a detail image as the pixelwise difference between the approximation image corresponding to the current iteration and the approximation image at a next coarser resolution level computed according the method step (a) with, both images being brought into register by proper interpolation of the latter image. The residual image is then equal to the approximation image produced by the last iteration.

The above method as well as other examples of procedures for acquiring such a multiresolution representation have been described in European patent application EP 527 525.

Next the pixel values of said detail images were subjected to a modification step in order to yield pixel values of a set of modified detail images. The pixel values of the detail images were modified according to at least one non-linear monotonically increasing odd conversion function with a slope that gradually decreases with increasing argument values.

Examples of such conversion functions are also disclosed in the already mentioned European patent application 527 525.

Finally an enhanced processed image was computed by applying a reconstruction algorithm to the residual image and the modified detail images, the reconstruction algorithm being such that if it were applied to the residual image and the detail images without modification, then said original image or a close approximation thereof would be obtained.

In this particular embodiment, this reconstruction algorithm was computed by iterating K times the following procedure starting from the coarsest detail image and the residual image:

-computing the approximation image at the current resolution level by pixelwise adding the detail image at the same resolution level to the approximation image at the coarser resolution level corresponding to the previous iteration, both images being brought into register by proper interpolation of the latter image, using however, the residual image instead of said coarser approximation image in the course of the first iteration.

Alternative reconstruction methods are also described in the above mentioned European patent application 527 525.

In some applications, radiologists protect their subjects against unnecessary exposure to X-rays by use of X-ray opaque 'collimation' material. The material is placed in the path of the X-ray beam so as to shield those areas of the patient which are not regarded as diagnostically important. Besides reducing patient dosage this technique has the additional advantage of limiting the amount of scattered radiation in the image field of interest. The regions of the resulting image which comprise the shadow cast by the X-ray opaque material (shadow regions) are exposed only by scattered radiation.

The presence of the collimation shadow region however can cause a problem in the display of the radiographic image on film or on a display device. Therein, the shadow region is relatively bright, and if displayed unmodified, may impair diagnosis of subtle lesions due to dazzle, especially if the unexposed region is relatively large.

It has been proposed in European patent application 523 771 to establish the region of interest and then to convert signal values of the radiographic image into density values to be displayed either as soft copy on a display device or as hard copy on film in such a way that pixels outside the diagnostically relevant zone are visualized so that the light transmitted by said image part when the hard copy is viewed on a console screen or when it is displayed, is effectively masked off.

In accordance with one embodiment described in this patent, the electrical signals of the pixels comprised within the diagnostically not relevant image zone within the radiographic image are converted to density values comprised between 0.5 and 2.5.

However, when applying the above described method the information within this diagnostically irrelevant is no longer visible.

And although radiologists are pleased with the fact that the dazzling effect produced by the light transmitted by the irrelevant region is decreased, they prefer to be able to keep at least an impression of the information that was present in the diagnostically irrelevant area.

This problem was solved in this particular embodiment by converting the pixel values of the radiographic image in such a way that the pixels outside the diagnostically relevant zone are visualized or reproduced so that the light transmitted by said image part when the hard copy is viewed on a console screen or when it is displayed, is lowered (so the average brightness level of the irrelevant zone is decreased) whereas the raw anatomical information of the radiographic image parts in the diagnostically irrelevant region remains visible.

This effect was obtained by processing pixels of the radiographic image differently when they were situated in the region of interest than when they were situated in the diagnostically irrelevant zone.

In order to enable distinct processing of pixels within the relevant image part from pixels outside a region of interest, it has to be decided first which pixels belong to the region of interest.

Several methods have been developed for recognizing a region of interest. In European patent application 523 771 a number of methods have been described for manually delineating the diagnostically relevant zone in a radiographic image.

The method applied in this particular application is a method for automatically determining the region of interest. This method has been described in extenso in European patent application 610 605.

In accordance with this method, the information as to whether or not a pixel was part of the region of interest was given by means of an overlay image. This overlay image is a low resolution binary image comprising labels which identify a pixel as belonging to the region of interest or not.

Pixels belonging to the irrelevant image zone were subjected to an additional look up table representing a conversion that provided (1) that the average brightness and contrast outside the region of interest is reduced and (2) that raw image information in this region is retained and visualized.

For this purpose, pixels within the relevant image zone are converted by means of an identity transformation whereas pixels outside the diagnostically relevant zone are converted in accordance with a conversion function that can be represented by a straight line located above the identity transformation and that has a slope in between 0 and 1 so that pixels outside the diagnostically relevant zone are converted to a higher average density than that of the remainder of the image and so that image information in that part of the image is not lost.

This conversion can generally be represented as:

$$g(x,y)=af(x,y)+(1-a)f_{max},$$

wherein g(x,y) is a pixel value after transformation, f(x,y) is the pixel value before conversion and 'a' is the slope of the conversion function applied to pixels outside the region of interest, $f_{max}$ is equal to $g_{max}$.

The slope 'a' has a value between zero and one and determines the minimum density to which pixel values in the diagnostically irrelevant zone can be converted.

In this specific embodiment wherein the radiographic image was first subjected to a decomposition into a multi-resolution pyramidal representation, which was then modified and finally applied to a reconstruction process, this additional conversion of pixels outside the relevant image zone (implemented as a look up table) was applied to the pixels of a partially reconstructed image taking into account the information whether a pixel is part of the region of interest or not. The latter information being applied by the information available from the above mentioned overlay image.

The modified partially reconstructed image which was subjected to the above additional transformation was then further subjected to the remainder of the reconstruction process described in European patent application 527 525 so as to generate a totally reconstructed and processed image.

Obviously this image was subjected to gradation processing before reproduction and/or display.

Blocking artifacts which were caused by the particular nature of the overlay image obtained by application of the method disclosed in European patent application 610 605, namely by the fact that the overlay image is a low resolution binary image, are avoided by transforming the binary overlay into a multiple valued overlay image through application of low pass filtering.

A gradual transition of the applied mapping transformations was provided for pixels outside the region of interest.

The slope and the intersect of the applied mapping transformation was controlled by the pixel value in the overlay image, being multiple valued instead of binary.

The applied mapping transformation has a maximal slope in the collimation material shadow region and is equal to the identity mapping in the diagnostically relevant image region.

This transformation can mathematically be expressed as follows:

TABLE 1

| Accessing circuit | Priority | Priority data |
|---|---|---|
| Circuit 14 | 1 | 100 |
| Circuit 15 | 2 | 010 |
| Circuit 16 | 3 | 001 | wherein f(x,y) are pixel values before transformation, c(x,y) equals zero for pixels within the region of interest and equals 63 for pixels inside the collimation shadow region and 'a' represents the mapping slope within the collimation shadow region.

If 'a' equals 1 then g(x,y) is equal to f(x,y) everywhere in the image, in other words there is no distinction between pixels within the region of interest or within the collimation shadow zone.

If for example 'a' equals ⅓; then in the region of interest c(x,y) is equal to zero and g(x,y) is equal to f(x,y) and outside the region of interest c(x,y) equals 63 so that $$g(x,y) = af(x,y) + (1-a)f_{max}.$$

By the low pass filtering referred to hereinbefore, c takes a value between zero and 63 so that a gradual transition is obtained between both mappings.

If 'a' equals zero then g(x,y) is equal to $f_{max}$ in the collimation shadow region.

The specific processing performed on the pixels in the diagnostically irrelevant zone can be performed on line as well as in the workstation.

The following is an explanation of the method of locating saturated pixels in the display of the radiographic image on the workstation.

In the workstation, the signal range occupied by the original image signal values acquired by the read out system described hereinbefore was mapped onto the dynamic range of the display device which was smaller than the range of the original signal values. Next the mapped signal values were transformed onto corresponding density values in accordance with a non-linear transformation curve which was a characteristic for the display device used (CRT device). A compensation for the non-linear behavior of the CRT device was also applied.

Figure 3:
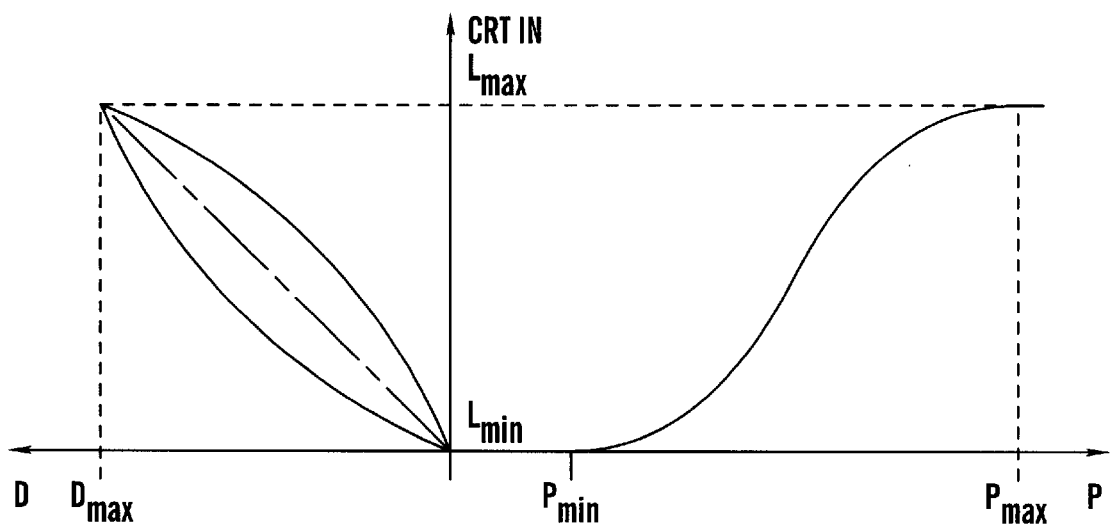
FIG. 3 is an example of a signal-to-density transformation of the first kind.

FIG. 3 illustrates a signal-to-density transformation that generally has a monotonically increasing path. Pixels having a pixel value smaller than $P_{min}$ are mapped onto a minimum density value $D_{min}$, whereas pixels having a pixel value greater than $P_{max}$ are mapped onto a maximum density value $D_{max}$.

When an image read out from an exposed photostimulable phosphor screen was converted in accordance with the above transformation and when the converted image was applied to the monitor for display, pixels having signal values smaller than $P_{min}$ or greater than $P_{max}$ were saturated.

The saturated pixels were generally located within a low density area (comprising pixels with very light grey tones) or within very dark area (comprising pixels with very dark grey tones) so that the saturated pixels were not discernable from the non-saturated pixels in the surrounding area having density values at the extremities of the displayable density range.

So, it was impossible for the radiologist to discern on the displayed image on the screen which locations were occupied by saturated pixels and which were not. It was consequentially not possible for the radiologist or the technician to evaluate whether the fact that some pixels were saturated in the display was acceptable because these pixels were located in diagnostically irrelevant image zones or alternatively, whether diagnostically important information was lost.

Figure 4:
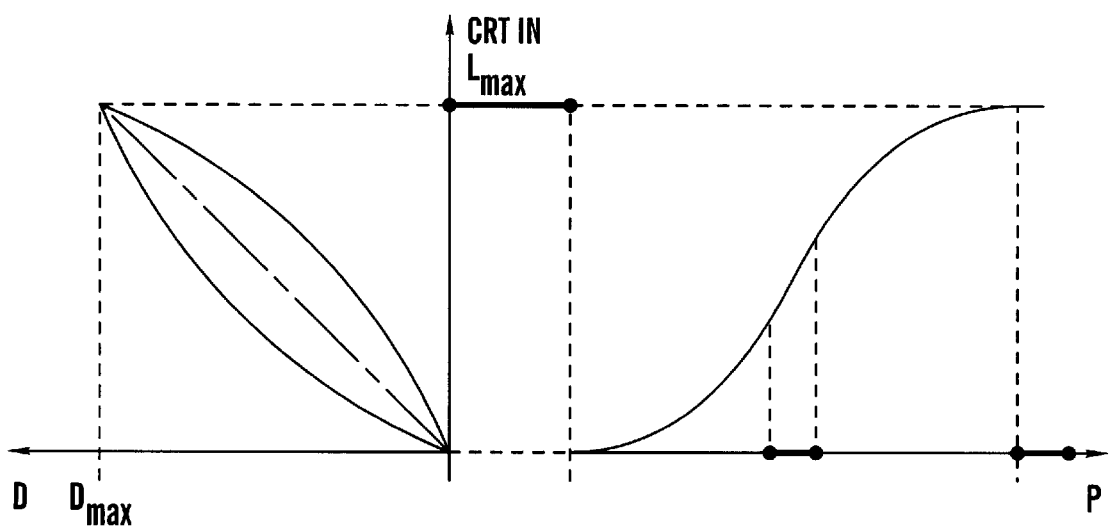
FIG. 4 is an example of a signal-to-density transformation of the second kind.

To solve this problem, the image values were -in accordance with the method of the present invention- once more mapped onto density values in accordance with a second transformation curve shown in FIG. 4.

The path of this curve was deduced from the path of the first transformation curve. More specifically, the path of this second transformation curve was identical to the path of the curve of FIG. 3 with the exception that discontinuities were present at abscissa values that correspond with pixels situated at locations wherein - when being transformed in accordance with the transformation of FIG. 3, so in the absence of these discontinuities - saturation would occur.

FIG. 4 shows the same curve of FIG. 3, however at the locations of low signal levels and high signal levels, the path of the signal to density transformation curve is amended so that small signal values are mapped onto the maximum density value and the highest signal values are mapped onto the minimum density displayable on the monitor.

Next, the image obtained by converting its pixel values onto corresponding density values in accordance with the curve of FIG. 4, is displayed.

On this image, the location of pixels that were saturated when being transformed in accordance with the first transformation were visualized since these pixels now have a density that is far different from the surrounding density. Indeed, pixels are mapped onto density values in accordance with a monotonically increasing path whereas discontinuously pixel values below a minimum signal value are converted to the maximum density level, so that in the display pixels that are situated at the low signal level part of the signal axis are mapped onto the maximum displayable density and will become discernable within the low density surrounding area.

Likewise signal values situated at the high signal level range are discontinuously mapped onto the minimum density level available in the displayed image so that they will appear as 'white' pixels within a generally dark grey surrounding area.

Additionally the function was made discontinuous over a range (also called window) of values not situated at the extremities of the range of acquired pixel values.

By means of a graphical user interface, the level and the window of this discontinuous range could be changed for example in such a way that the discontinuous range is moved in a range of pixel values wherein saturation occurs. When applying this transformation the location of saturated pixels could be visualized on the display device.

Upon evaluation by the radiologist whether these saturated pixels are situated in a diagnostically important part of the displayed image or not, the radiologist could amend at least some of the values of the look up table representing the first signal-to-density transformation curve so that saturation will no longer occur in a diagnostically important image zone.

The above explanation of the present invention is given in respect of a conversion of signal values in density values. It will be clear to the man skilled in the art that the same method can be applied in cases wherein intensity values are used instead of density values.

We claim:

1. A method of determining the location of pixels in a radiographic image that are saturated when digital pixel values of said image are transformed into density values in accordance with a first signal-to-density transformation comprising the steps of converting the digital pixel values of said radiographic image into density values in accordance with a second signal-to-density transformation that is substantially identical to said first transformation except that it comprises at least one discontinuity in a pixel value corresponding with a pixel of said image that would be saturated when being converted in accordance with said first transformation, and applying pixel values converted according to said second transformation to a display device.

2. A method according to claim 1 wherein said second transformation has an ordinate value in one or more discontinuities thereof and wherein a a difference between the ordinate value in any discontinuity of said second transformation and an ordinate value of a neighboring value of said discontinuity is as large as possible within a dynamic range of said display device.

3. A method according to claim 2 wherein the ordinate value in said discontinuity is a maximum value of the dynamic range of said display device.

4. A method according to claim 2 wherein the ordinate value in said discontinuity is a maximum value of the dynamic range of said display device.

5. A method according to claim 2 wherein the ordinate values corresponding with a range of abscissae values wherein said transformation has a discontinuous behavior are equal to the maximum value of the dynamic range of said display device.

6. A method according to claim 2 wherein the ordinate values corresponding with a range of abscissae values wherein said transformation has a discontinuous behavior are equal to the minimum value of the dynamic range of said display device.

7. A method according to claim 1 wherein a digital signal representation is obtained by scanning a photostimulable phosphor screen wherein an image has been stored with stimulating irradiation, detecting a light emitted upon stimulation and converting the detected light into a digital signal representation.

8. A method according to claim 1 wherein said first transformation can be represented by a monotonically increasing or decreasing function converting signal values onto density values whereby signal values smaller than a predetermined minimum value are transformed into a value equal to the minimal displayable density value and signal values above a predetermined maximum value are transformed into a value equal to the maximum displayable density value and wherein said second transformation has substantially the same shape as said first transformation with the exception of a first discontinuity situated at said minimum value and a second discontinuity situated at said maximum value.

9. A method according to claim 8 wherein an ordinate value of all pixel values smaller than said first discontinuity is equal to the maximum of displayable density values and an ordinate value of all pixels larger than said second discontinuity is equal to the minimum of displayable density values.

10. A method according to claim 1 wherein said first transformation has a shape and wherein, upon evaluation of a location of one or more discontinuities in a displayed image obtained by applying a density value representation converted in accordance with said second transformation to said display device, the shape of said first transformation is changed.

11. A workstation for processing a digital image representation and displaying an image corresponding with a processed digital image representation comprising means for storing a first signal-to-density transformation, means for storing a second signal-to-density transformation that is substantially identical to said first transformation with the exception of at least one discontinuity located in at least one corresponding pixel that was saturated when being converted in accordance with said first transformation, means for transforming a digital image representation in accordance with one of these transformations and means for displaying a transformed image.

12. A workstation according to claim 11 comprising a user interface that can change the position of said at least one discontinuity within the range of signal values of said digital representation.

13. A workstation according to claim 11 comprising means for changing a width of a range wherein said second transformation is discontinuous.

* * * * *